(12) United States Patent
Aiki et al.

(10) Patent No.: US 7,696,867 B2
(45) Date of Patent: Apr. 13, 2010

(54) SENSOR NODE

(75) Inventors: Kiyoshi Aiki, Hachioji (JP); Shunzo Yamashita, Musashino (JP); Takeshi Tanaka, Akishima (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 11/779,020

(22) Filed: Jul. 17, 2007

(65) Prior Publication Data

US 2008/0055069 A1 Mar. 6, 2008

(30) Foreign Application Priority Data

Aug. 29, 2006 (JP) ............... 2006-232293

(51) Int. Cl.
- G08B 1/08 (2006.01)
- G08B 21/00 (2006.01)
- G06F 1/26 (2006.01)
- G06F 1/00 (2006.01)

(52) U.S. Cl. ................. 340/539.1; 340/636.1; 713/320; 713/321; 713/322

(58) Field of Classification Search ............... None
See application file for complete search history.

(56) References Cited

U.S. PATENT DOCUMENTS

| | | | |
|---|---|---|---|
| 2005/0200002 A1 | 9/2005 | Yamashita | |
| 2005/0258949 A1* | 11/2005 | Iwazumi | 340/442 |
| 2006/0172784 A1 | 8/2006 | Ara et al. | |
| 2007/0030154 A1 | 2/2007 | Aiki et al. | |
| 2007/0240003 A1* | 10/2007 | Watts, Jr. | 713/322 |
| 2008/0130253 A1* | 6/2008 | Yamashita | 361/760 |
| 2008/0150645 A1* | 6/2008 | McCorquodale et al. | 331/117 R |
| 2009/0009356 A1* | 1/2009 | Stepanian | 340/825.24 |

FOREIGN PATENT DOCUMENTS

| | | |
|---|---|---|
| JP | 2001-59752 | 3/2001 |
| JP | 2005-260291 | 9/2005 |
| JP | D1255201 | 9/2005 |
| JP | 2005-329856 | 12/2005 |
| JP | 2006-211439 | 8/2006 |
| JP | 2006-288619 | 10/2006 |
| JP | 2006-295956 | 10/2006 |

\* cited by examiner

*Primary Examiner*—Julie Lieu
(74) *Attorney, Agent, or Firm*—Mattingly & Malur, P.C.

(57) ABSTRACT

A sensor node for intermittently sensing data in a short cycle includes a control unit for acquiring information by driving the sensor, a radio communication unit for transmitting the information acquired by the control unit and a battery for supplying the control unit. The control unit includes a clock supply unit (RTC) for supplying the control unit with clocks at a predetermined frequency. A sensor control unit starts the supply of power to the sensor when the measurement period has begun, maintains the power supply to the sensor even if the control unit has shifted to the standby state during the measurement period, and shuts down the power supply to the sensor when the measurement period has been completed. A measurement unit is also provided for acquiring information from the sensor every time the latter has shifted to the operational state.

7 Claims, 11 Drawing Sheets

| ELEMENT | POWER CONSUMPTION | | CONTROL | |
|---|---|---|---|---|
| | IN OPERATION | STANDBY | POWER SOURCE | OPERATING MODE |
| RF | 30mA | 1μA | ALWAYS | OPERATING/STANDBY |
| MICROCOMPUTER | 5mA | 0.5μA | ALWAYS | OPERATING/STANDBY |
| SENSOR | 0.5mA | — | ON/OFF | — |
| RTC | 1μA | — | ALWAYS | — |

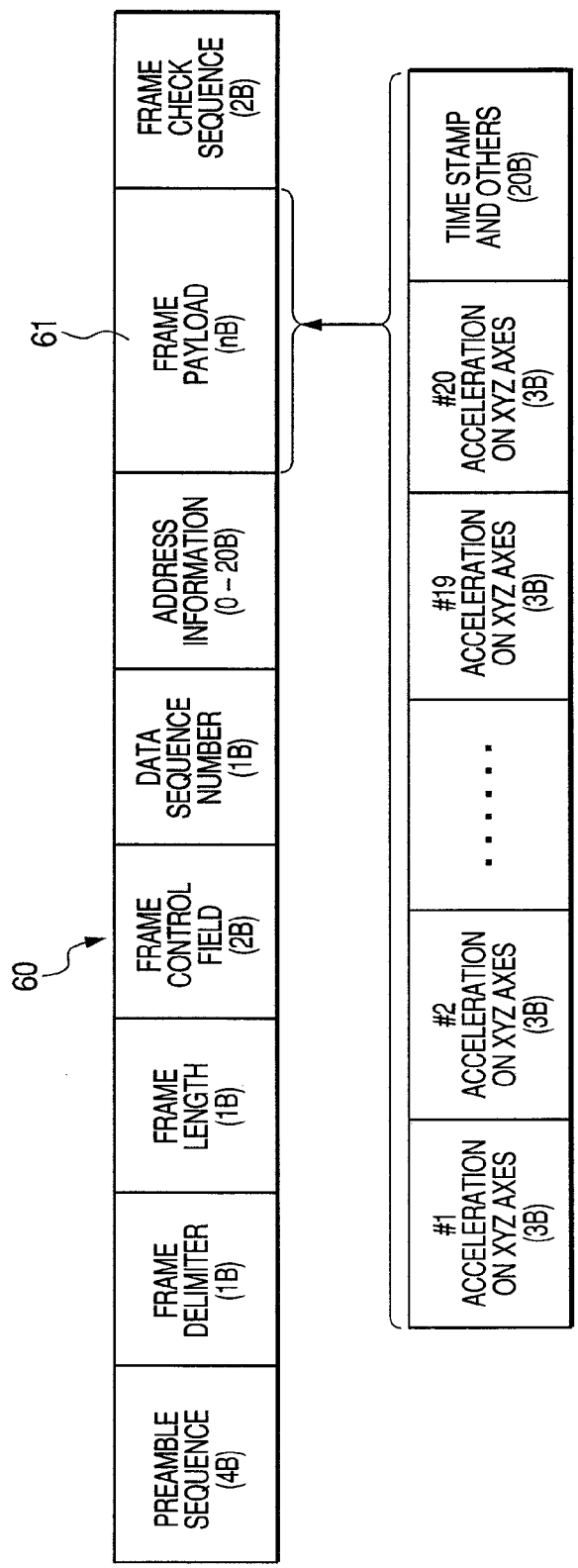

SENSOR NODE

CLAIM OF PRIORITY

The present application claims priority from Japanese application JP 2006-232293 filed on Aug. 29, 2006, the content of which is hereby incorporated by reference into this application.

FIELD OF THE INVENTION

The present invention relates to improvements of a sensor node with radio communication function usable on a sensor net and in particular to a sensor node driven by a battery.

BACKGROUND OF THE INVENTION

In recent years, we have seen efforts to realize a network system (hereinafter referred to as "sensor net") for bringing in various information of the actual world in real time into an information processing device by adding a small electronic circuit having a radio communication function to the sensor. A wide range of application is considered for the sensor net. For example, a proposal for its medical application is the use of a small electronic circuit integrating a radio communication circuit, a processor, a sensor and a battery to constantly monitor biological information such as pulse and the like. The monitor result is transmitted to a diagnosis device by radio communication and it is used to judge the health condition of the user.

In order to promote extensively the actual use of the sensor net, it is important to make the electronic circuit having a radio communication function, a sensor and a power source such as battery (hereinafter referred to as "sensor node") maintenance-free over a long period of time and capable of transmitting continuously sensor data, and to miniaturize its external dimension. For this reason, efforts have been made to develop a miniature sensor node that can be placed anywhere.

In such a sensor node, in order to reduce the power consumption, it has been considered to operate intermittently the sensor, the CPU and the like to restrict the consumption of the battery. As a sensor node having a sensor and a CPU for sensing intermittently, for example the one described in JP-A No. 2005-3229856 is known. In this example, a sensor for collecting the information of a tire state detecting sensor and the like operating intermittently and for transmitting the same by radio communication is disclosed. Based on signals emitted from a constantly operating low-current oscillator, the CPU is started intermittently to supply the sensor and the radio communication unit with power, to enable the sensor to observe and transmit the observation values. And when the transmission of the sensing data is completed, the power supply to the CPU, the sensor and the radio communication unit is cut off.

As a system for cutting down the power consumption of the CPU controlling the sensor, the one that keeps the sensor constantly in operation and switches the CPU from the standby state to the operational state when any sensing data have developed (for example, JP-A No. 2001-59752) is known.

SUMMARY OF THE INVENTION

Incidentally, in the case of a sensor node for monitoring biological information such as the pulse mentioned above, it is desirable that the sensor node constantly monitors and promptly detects the development of any anomaly. On the other hand, since such a sensor node is worn personally on the living body of the user, the sensor node itself must be of a small and light construction, and the capacity of the battery is limited. And it is not practical unless the cycle of battery replacement or charge is long to the maximum extent possible.

As a result, a possible solution is to set a short cycle of intermittent sensing and to monitor biological information almost continuously. Here, a sensor node for observing biological information can obtain almost at the real time the biological information of any moving living body provided that it includes a sensor, a radio communication unit for transmitting the information acquired by the sensor, and a CPU for controlling the sensor and the radio communication unit.

However, in the case of the conventional example described above, since the sensor, the CPU and the radio communication unit are started altogether at the same time for the intermittent operation of the sensor node, all the circuits are supplied with power during the period from the measurement of the sensor to the end of the radio communication. Thus, a small and light battery cannot stand any extended use, because power consumption becomes excessive. And this constitutes a serious problem.

If the cycle of intermittent sensing is shortened, in the case of repeating intermittently several tens of times of such sensing per second for example, the cycle of turning "on" and "off" of the power source of the sensor node will be shortened. Since a certain length of time is required from the moment when the power is switched "on" from "off" until the state in which normal measurement can be realized is reached depending on the type of sensor, even if the CPU has completely started, it is necessary to stand by until the sensor stabilizes. During this period of time, power is wasted. In particular, as the radio communication unit consumes much power, in a system according to the JP-A No. 2005-329856 and the like, wasted power account for an important part of the power consumed by the radio communication unit.

Accordingly, the present invention was made in view of the problem mentioned above, and the object is to increase the period of time wherein a sensor node for intermittently sensing with a short cycle can be continuously used while containing the consumption of battery.

The present invention relates to a sensor node including a control unit for acquiring information by driving a sensor, a radio communication unit for transmitting the information acquired by the control unit and a battery for supplying the control unit, the radio communication unit and the sensor with electric power, in which the control unit includes a clock supply unit for supplying the control unit with a clock with the predetermined clock frequency, a standby control unit for repeating with the predetermined cycle the operational state for supplying a clock of the predetermined frequency from the clock supply unit during the previously set measurement period and the standby state for suspending the clock or lowering the clock frequency, a sensor control unit for starting the supply of power to the sensor when the predetermined measurement period has started, for maintaining the supply of power to the sensor even if the control unit is in the standby state during the measurement period, and for shutting down the supply of power to the sensor when the measurement period has ended, and a measurement unit for acquiring the information from the sensor every time it returns to the operational state.

The measurement unit stores the information acquired from the sensor in the storage unit every time when it enters into the operational state, and the control unit further includes a radio communication control unit for switching the radio communication unit from the standby state to the operational state, transmitting the information en bloc when the number of information stored in the storage unit has reached the predetermined number, and for switching the radio communication unit to the standby state after the transmission has been completed, and the standby control unit switches the control unit to the standby state when the radio communication control unit has switched the radio communication unit to the standby state.

Therefore, according to the present invention, during the measurement period the control unit acquires the information measured intermittently by the sensor (sensing data) by suspending the clock intermittently or lowering the clock frequency. By this mechanism, the control unit constituted by a microcomputer consuming much power and the like is limited to the minimum necessary operating time, and the sensor requiring much time for stabilization immediately after the supply of power is continuously supplied with power during the measurement period. Since the power consumption of a sensor is very small as compared with the power consumption of the control unit, the useless consumption of power can be avoided during the standby period of the control unit until stabilization when the sensor is switched "on" or "off." In particular, even in the case of intermittent sensing with a short cycle, the consumption of battery can be contained and the period of continuous usability can be increased.

In addition, the operation time of the radio communication unit consuming much power during its operational state can be abridged, and the consumption of battery can be contained by transmitting en bloc a plurality of sensing data and by turning the radio communication unit in the operational state only during this transmission time.

BRIEF DESCRIPTION OF THE DRAWINGS

FIG. 7 is likewise an illustration describing a transmission frame;

FIG. 8 is likewise an illustration showing the data length of various parts of a transmission frame;

DETAILED DESCRIPTION OF THE PREFERRED EMBODIMENTS

We will describe below an embodiment of the present invention with reference to the attached drawings.

Figure 1:
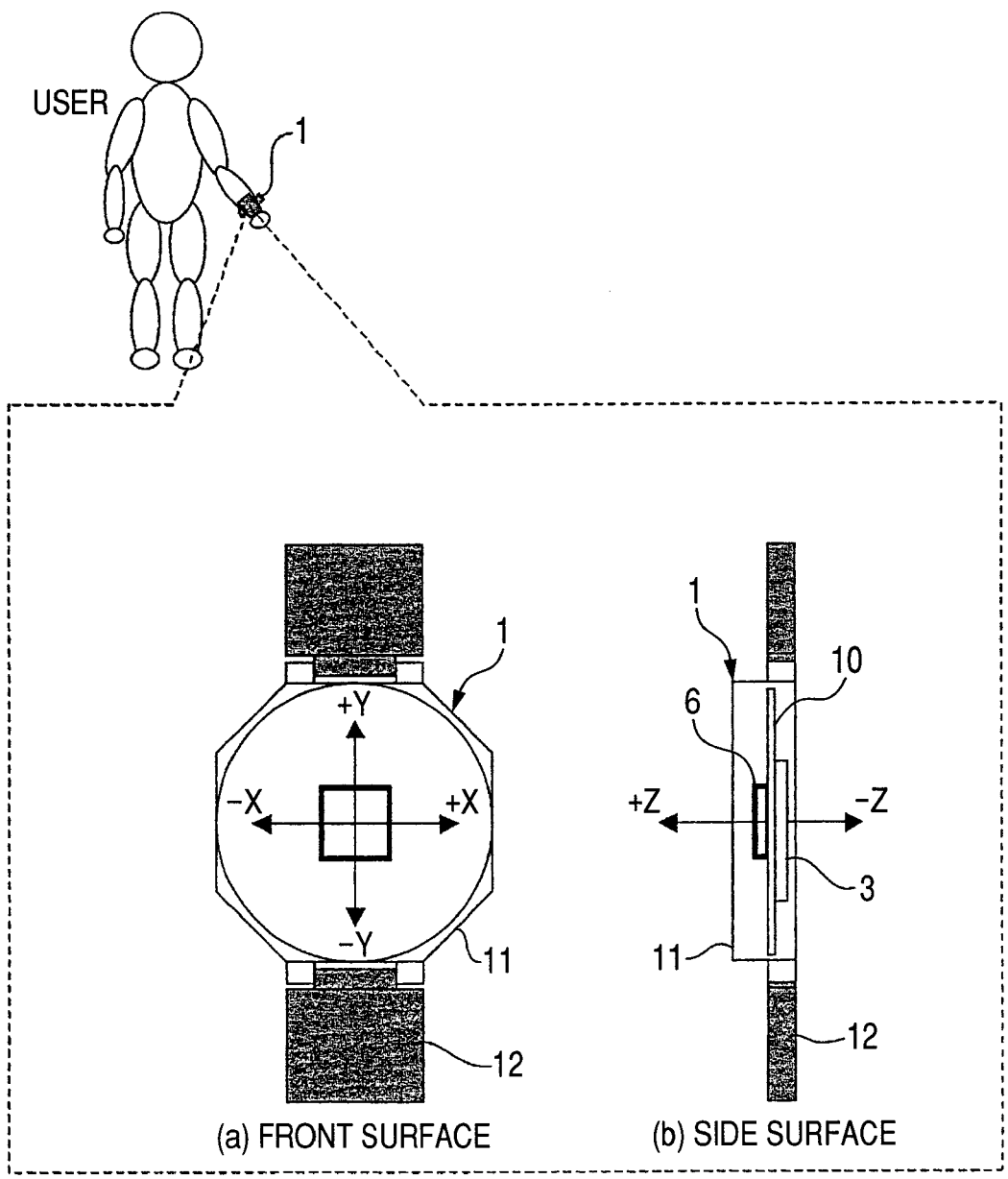
FIG. 1 shows the first embodiment and a bracelet-type sensor node, and (a) is a front elevation while (b) is a side sectional view.

FIG. 1 shows the first embodiment and shows an example of applying the present invention to the bracelet-type (or wrist watch-type) sensor 1. FIG. 1(a) is a schematic view as seen from the front face of the sensor node 1, and (b) is a sectional view as seen from the lateral side. This sensor node 1 measures mainly the movement of the wearer.

The sensor node 1 includes a case 11 for storing a sensor and controller and a band 12 for fixing the case 11 to the human wrist.

The case 11 houses a board 10 on which a microcomputer 3, a sensor 6 and the like are fixed as shown in FIG. 1(b). And as the sensor 6 for measuring the movement of the human body (living body), an example in which an acceleration sensor for measuring respectively triaxial acceleration along the X-Y-Z axes as shown in the figure is adopted.

The control device 13 includes a microcomputer for controlling the sensor 6 and a radio communication unit for transmitting the measured data (sending data) as described further below.

Figure 2:
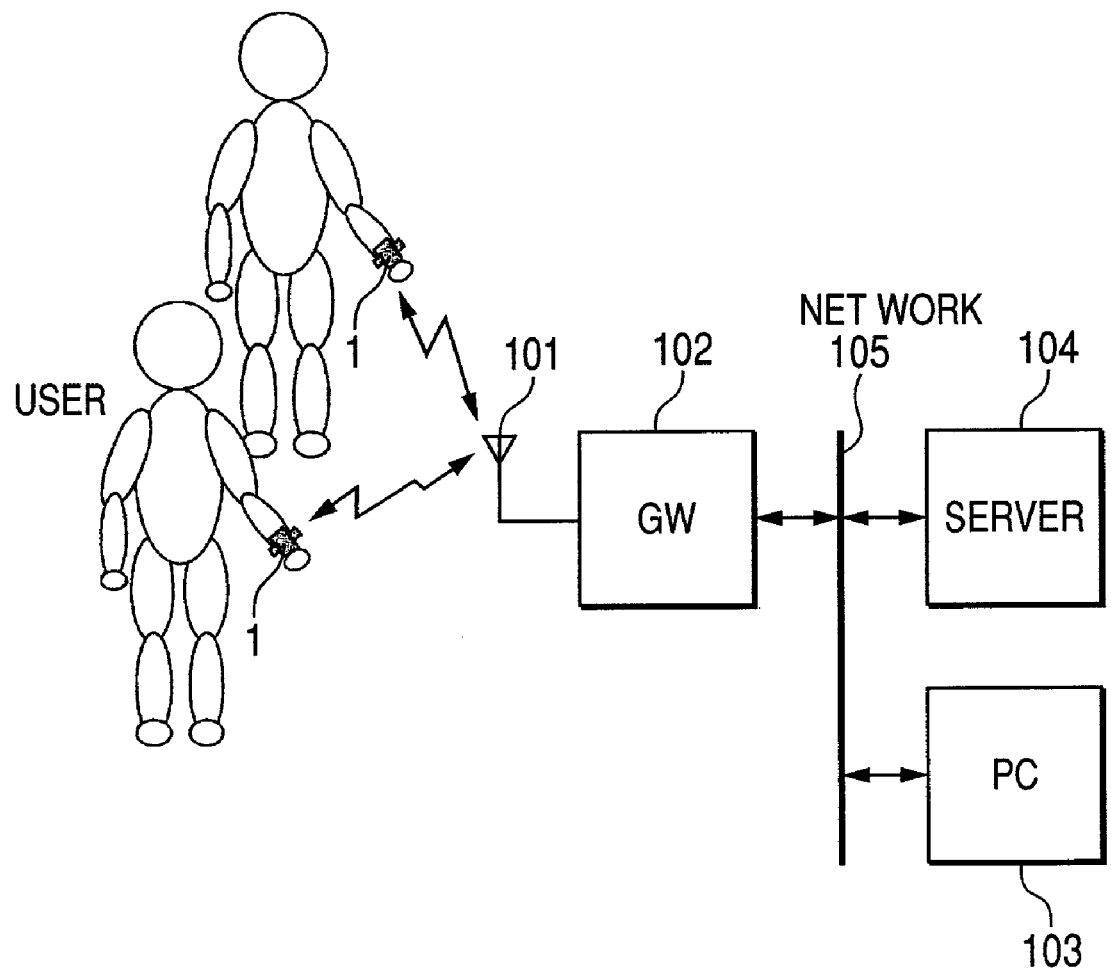
FIG. 2 is likewise a block diagram of a sensor net system.

FIG. 2 is a block diagram describing the configuration of system showing an example of constructing a sensor net system by using the bracelet-type sensor node 1 according to the present invention.

In FIG. 2, the gateway 102 communicates with a plurality of sensor nodes 1 through the radio communication unit 101, receives the sensing data corresponding to the movement of the wearers from each sensor node 1 and transfers them to the server 104 through a network 105. The server 104 stores the received sensing data, and offers the sensing data in response to the demand from the computers (PC) 103 used by the client. The computer 103 monitors the applications for monitoring the sensing data from specific sensor nodes 1 and sensing data from a plurality of sensor nodes 1, detects anomalies and executes the application for displaying the anomalous sensing data on a display (not shown) and the like.

Figures 3, 4:
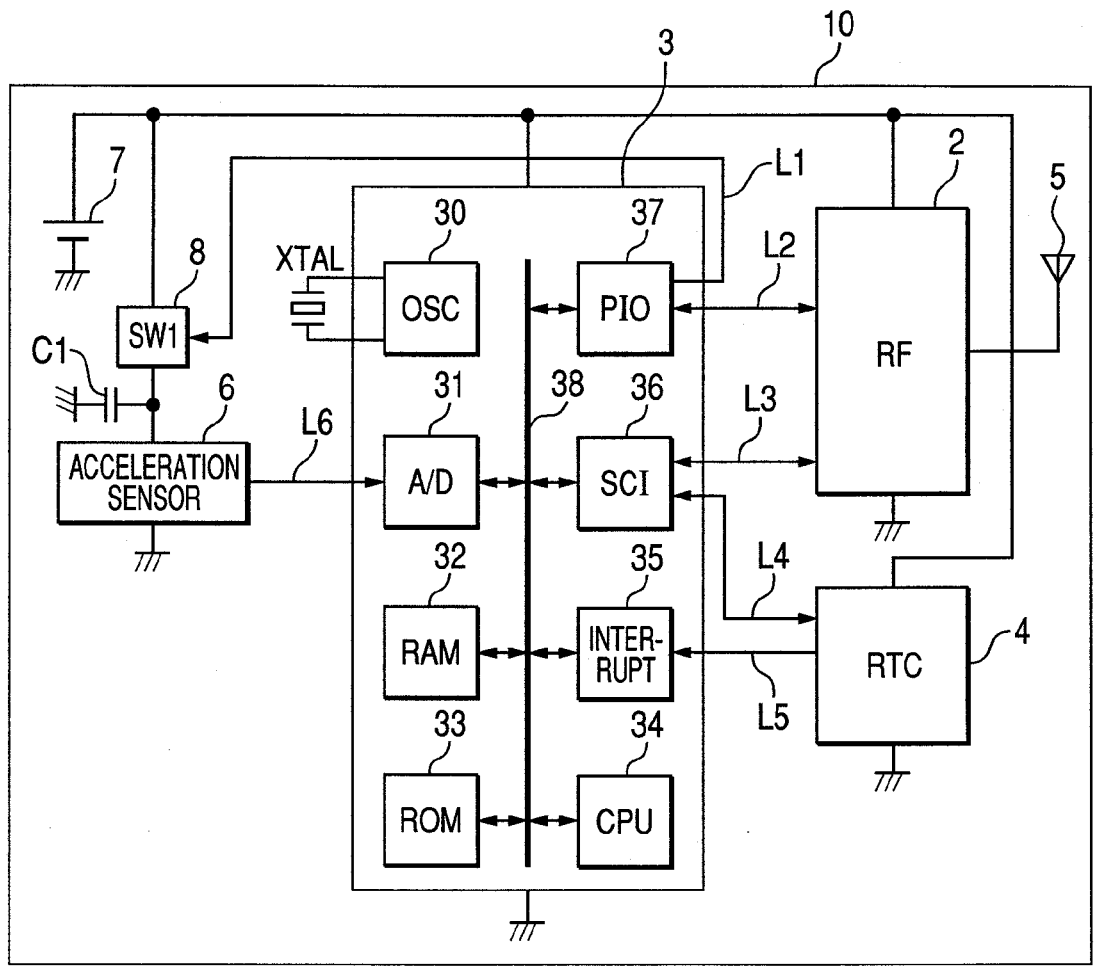
FIG. 3 is likewise a block diagram showing the configuration of the sensor node.
FIG. 4 is likewise a descriptive illustration showing the power consumption of various component elements of the sensor node.

FIG. 3 is a block diagram of an electronic circuit fixed on the board 10 of the sensor node 1. In FIG. 3, the board 10 includes a radio communication unit (RF) 2 having an antenna 5 for communicating with the gateway 102, a sensor 6, a microcomputer for controlling the sensor 6 and the radio communication unit 2, a real-time clock (RTC) 4 functioning as a timer for staring intermittently the microcomputer 3, a battery 7 for supplying various parts with power, and a switch 8 for controlling the supply of power to the sensor 6. Between the switch 8 and the sensor 6, a by-pass capacitor C1 is connected enabling to eliminate noises, reduce the charge and discharge speed and prevent the consumption of useless power. It will be possible to contain useless consumption of power by controlling the switch 8 in such a way that the number of charges and discharges of the bypass capacitor 1 may be reduced.

The microcomputer 3 includes a CPU 34 for executing computing operations, a ROM 33 for storing the programs executed by the CPU 34, a RAM 32 for storing data, an interrupt control unit for interrupting the CPU 34 based on the signals from the RTC 4 (timer interrupt), an A/D converter 31 for converting the analog signals outputted from the sensor 6 into digital signals, a serial communication interface (SCI) 36 for transmitting and receiving signals in the form of serial signals to and from the radio communication unit 2, a parallel interface (PIO) 37 for controlling the radio communication unit 2 and the switch 8, and an oscillation unit (OSC) 30 for supplying various parts in the microcomputer with clocks. And various parts in the microcomputer 3 are connected through a system bus 38.

The RTC 4 outputs interrupt signals (timer interrupt) at the predetermined cycle set in advance at the interrupt control unit 35 of the microcomputer 3 and outputs the reference clock to the SCI 36. The PIO 37 controls the "on/off" of the switch 8 in response to the command of the CPU 34, and controls the supply of power to the sensor 6.

At this point, the microcomputer 3 can switch the operational state in which computing operations are executed according to the clock supplied by the OSC 30 and the standby state (software standby) in which the clock supplied by the OSC 30 is suspended to suspend the computing operation and the memory contents of the RAM 32 are maintained. The timing of transition between the two states may be set in advance in the microcomputer 3. In addition, a plurality of menus may be prepared, and the possibility of choosing the timing mentioned above may be offered through the input unit provided in the sensor node 1. It is also possible to adopt a system in which an instruction of choice is given to the sensor node 1 based on the input from an apparatus of a higher rank connected with the sensor 1. Furthermore, if a system in which the sensor node sets the menu by automatically switching over the same depending on the specific time zone between the first menu during the daytime and the second menu at night is adopted, sensing meeting more the needs of the user will be possible. Incidentally, the RAM 32 can be constituted by for example a SRAM and the like. The clock supplied by the OSC 30 is suspended by a command of the CPU 34 and the microcomputer 3 shifts to the standby state. At this time, the supply of power to the microcomputer 3 from the battery 7 continues. Incidentally, the standby state of the microcomputer 3 may be realized by lowering the clock supplied by the OSC 30.

Then, upon the input of the predetermined signals (timer interrupt) from the RTC 4, the interrupt control unit 35 executes a timer interrupt operation on the CPU 34 and have the clock from the OSC 30 outputted to shift to the operational state. And the OSC 30 can change the frequency of the clock to be supplied to various parts within the microcomputer 3 in response to the command from the CPU 34. Upon receipt of the predetermined command from the CPU 34, the OSC 30 can change for example the regular clock frequency with a frequency equivalent to one half of the former.

Thereupon, the microcomputer 3, the radio communication unit 2, the sensor 6 and the RTC 4 of the sensor node 1 are supplied with power from a chargeable battery 7, and only the RTC 4 keeps on operating constantly and outputs timer interrupts to the microcomputer 3 at the predetermined cycle. Upon receipt of a timer interrupt from the RTC 4, the microcomputer 3 starts from the standby state and shifts to the operational state, controls independently the power supply to the sensor 6 and the radio communication unit 2, makes various part to operate separately to acquire and accumulate the sensing data as described further below and transmits the accumulated sensing data to the gateway 102. The present embodiment includes the cycle in which the microcomputer 3 starts at the predetermined cycle, acquires the sensing data measured by the sensor 6, stores the same in the RAM 32 and shifts to the standby state, and the cycle in which the microcomputer 3 acquires sensing data, stores them in the RAM 32, transmits a plurality of the sensing data stored in the RAM 32 en bloc to the gateway 102, and then shifts to the standby state.

Figure 6:
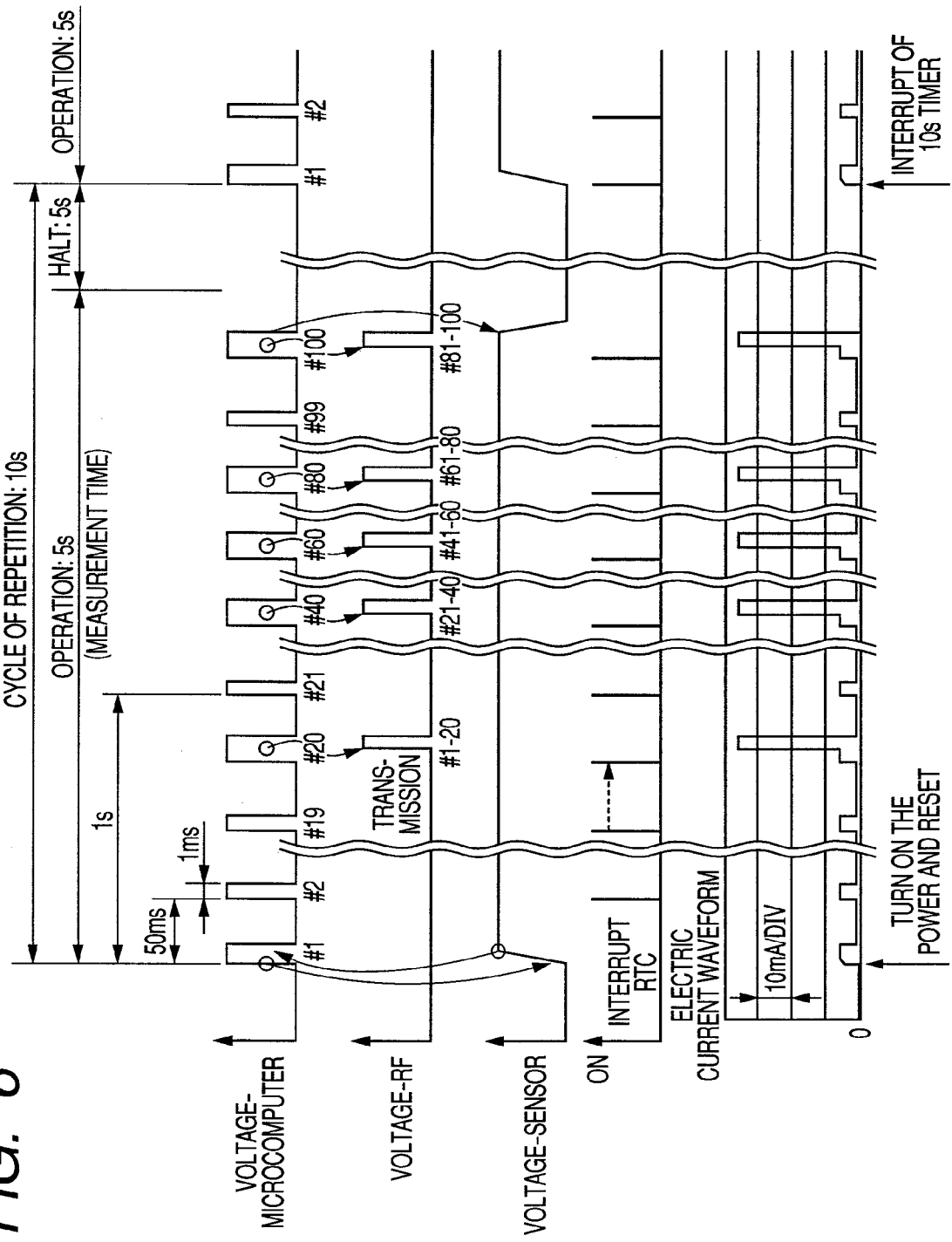
FIG. 6 is likewise a time chart showing the way the measurements and communication are executed by the sensor node.

Now, we will describe the outline of the power control in various parts carried out when the CPU 34 is in the operational state with reference to FIG. 6.

Upon its start, in the beginning the microcomputer 3 turns on the switch 8, begins supplying the sensor 6 with power and starts. At this time, the radio communication unit 2 is not fed with power and is kept in the standby state. And after acquiring the sensing data from the sensor 6 and storing the same in the RAM 32, the microcomputer 3 shifts to the standby state. At this time, the microcomputer 3 sets the predetermined cycle (for example, 50 msec) in the RTC 4, starts and repeats thereafter acquiring the sensing data by accepting the timer interrupt from the RTC 4 at intervals of the predetermined cycle (50 msec).

After the sensing data have been acquired for the predetermined number of times (for example, 20 times), the radio communication unit 2 is started and 20 pieces of sensing data accumulated in the RAM 32 are transmitted to the gateway 102. After the transmission has been completed, the radio communication unit 2 is reset in the standby state. And after transmitting the sensing data five times, the power supply to the sensor 6 is cut off and the microcomputer 3 shifts to the standby state. At this time, a predetermined length of time (for example 5 seconds) is set in the timer of the RTC 4, and five seconds later the microcomputer 3 is started by the timer interrupt supplied from the RTC 4.

Therefore, during five seconds the sensor node 1 shifts to the standby state every time sensing data are measured every 50 msec, and transmits sensing data en bloc at intervals of a second (50 msec×20 times) to the gateway 102. After transmitting 100 pieces of sensing data divided into five small blocs, it remains in the standby state for the predetermined time (five seconds). And as the microcomputer 3 is started five seconds later by the timer interrupt supplied from the RTC 4, the sensor node 1 starts every ten seconds to repeat measurements for five seconds.

Since the sensor 6 requires time from the beginning of power supply to the moment when it is possible to measure, power is supplied continuously during the period of measurement. On the other hand, the microcomputer 3 and the radio communication unit 2 consuming much power are set in the operational state only during the period of use, and are kept in the standby state for the rest of time. This reduces the power consumption of the sensor node 1, and increases the driving time of the battery 7.

An example of the power consumption of various elements of the sensor node 1 is shown in FIG. 4. The power consumption of the radio communication unit 2 (RF) reaches the maximum point at 30 mA in the operational state and 1 µA in the standby state. The reason why the radio communication unit 2 is not cut off from the supply of power and is kept in the standby state is that it is impossible to communicate immediately after the beginning of power supply, and it takes time until the circuit stabilizes. The continuous supply of feeble current in the standby state enables to start communicating at once after the switch over to the operational state.

Another important point to remember is that the microcomputer 3 consumes 5 mA in the operational state and 0.5 µA in the standby state. These values represent the second highest consumption of power after that of the radio communication unit 2. As a result, after acquiring sensing data from the sensor 6, it is immediately shifted to the standby state to contain its power consumption.

The microcomputer 3 controls so that power may be continuously supplied to the sensor 6 during the measurement time of the sensing data (100 times≈5 seconds). As described above, the sensor 6 cannot measure stably immediately after the beginning of power supply, and it requires a predetermined period of time. As a result, if the microcomputer is turned on and off every time it starts and enters into the standby state, the microcomputer 3 consumes power all for nothing during the period leading to the stabilization of the sensor 6. In particular, in the case of repeating 100 times the start/standby of the microcomputer 3 every five seconds as shown in FIG. 6, when the switching ON/OFF of the sensor 6 is synchronized every 50 msec with the microcomputer 3, the power consumed in vain by the microcomputer 3 during the period in which the sensor 6 stabilizes will not be negligible. As a result, the continuous supply of power to the sensor 6 during the period of measurement is advantageous for the containment of power consumption.

Finally, it is essential to maintain constantly the supply of power to the RTC 4 to enable the same to generate the interrupt signals for shifting the microcomputer 3 from the standby state to the operational state. Since the power consumption of the RTC 4 is the smallest at 1 μA even in the operational state, it is possible to keep the same constantly fed with power.

Figure 5:
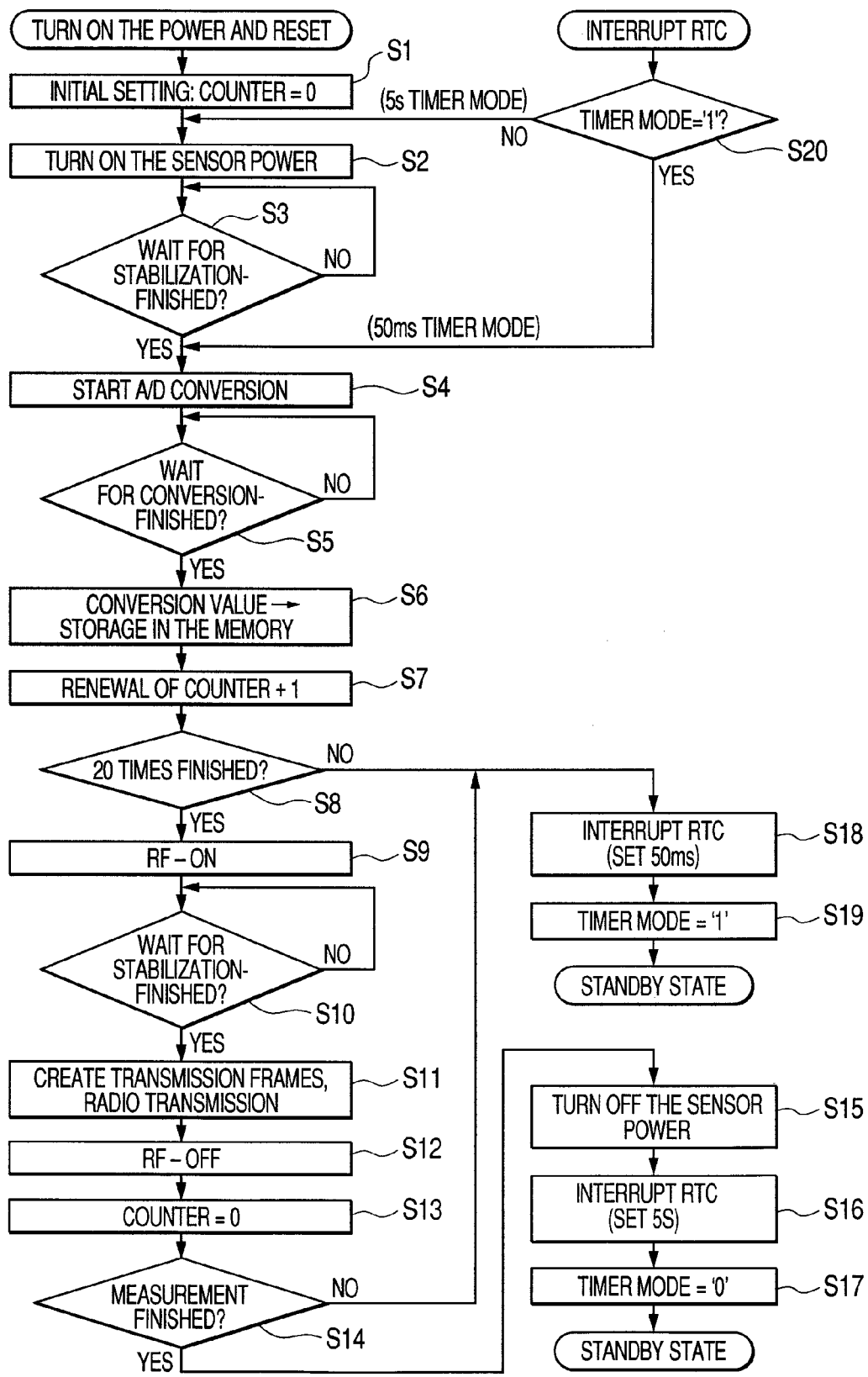
FIG. 5 is likewise a flowchart showing an example of operations executed by the sensor node.

We will now describe in details below an example of operation executed by the microcomputer 3 of the sensor node 1 with reference to the flowchart of FIG. 5. The flowchart of FIG. 5 represents a program stored in advance in the ROM 33, which will be executed when the power source of the sensor node 1 is turned on.

In the step S2, the register, the RAM 32 and the like are initialized, and the counter for counting the number of sensing data is reset at 0. Incidentally, the counter represents a parameter and is maintained in the RAN 32.

In the step S2, the switch 8 is turned on to begin the supply of power to the sensor 6. And in the step S3, it will be judged whether the sensor 6 has stabilized and whether it has become possible to measure acceleration or not. For this judgment, if the predetermined length of time (several msec and the like) has elapsed, it will be judged that the sensor 6 has stabilized and the process proceeds to the step S4. If that is not the case, the process remains in loop state at the step S3 until the predetermined length of time has elapsed.

In the step S4, the A/D converter 31 is started and the measurement of the sensor 6 is read. In the step S5, it will be judged whether the A/D converter 31 has completed the conversion of analog values supplied by the sensor 6 into digital values. Incidentally, for this judgment, it can be judged that the conversion has been completed when a value is set in the predetermined register of the A/D converter.

Then, in the step S6, the measurements (sensing data) converted by the A/D converter 31 are stored in the RAM 32. The RAM 32, in which ring buffers are set for example, can store sensing data for every plurality of measurements.

And in the step S7, having acquired a piece of sensing data, 1 is added to the counter.

In the step S8, it will be judged whether the counter value has reached the predetermined value (20 in this embodiment) or not. This predetermined value is set in advance at the number of sensing data transmitted en bloc in a transmission when the sensor node 1 transmits to the gateway 102.

If the counter value has reached 20, the process proceeds to the step S9 and transmits, and if the counter value has not reached 20, the process proceeds to the step S16.

In the step S16 in which the counter value is less than 20, the cycle of starting the microcomputer 3 (for example 50 msec) during the measurement period of the sensor 6 is set in the RTC 4, and in the step S17 the timer mode of the measurement period is set at 1. This timer mode shows the type of interrupt signal generated by the RTC 4, and "1" shows that it is within the measurement period, while "0" shows that it is during the down period (five seconds shown in FIG. 6) before the beginning of the following measurement period. And the process ends by shifting the microcomputer 2 to the standby state.

On the other hand, in the step S9 in which the counter value has reached the predetermined value (20), the radio communication unit shifts from the standby state to the operational state. And in the step S10, it is judged whether the radio communication unit 2 has stabilized to the point of being able to communicate. For this judgment, for example, it will be judged that the radio communication unit 2 has stabilized if the predetermined length of time (for example, 0.5 msec) has elapsed, and the process proceeds to the step S11. If that is not the case, the process remains in loop at the step S10 until the predetermined length of time elapses.

Then, in the step S11, a transmission frame is created in order to transmit en bloc a plurality of pieces (20 pieces) of sensing data to the gateway 102. An example of the transmission frame is created according to the format shown in FIG. 7. In FIG. 7, the transmission frame 60 includes the header information constituted by the preamble sequence—address information and the payload 61, which stores 20 pieces of sensing data accumulated in the RAM 32. In the illustrated example, the triaxial (X axis, Y axis and Z axis) sensing data measured by the sensor 6 are respectively represented by a byte, and a single piece of sensing data is constituted by three bytes. The first to 20th measurements are stored in the chronological order in the payload 61. The time of last transmission (the current time) is set in the time stamp to create the transmission frame 60. Incidentally, as FIG. 8 shows, the transmission frame 60 is constituted by 20 bytes for the header information and 80 bytes for the payload length totaling 100 bytes for the whole length. If the transmission speed is 250 kbps, the transmission time is 3 msec. In this example, the case of adopting the International Standard IEEE802.15.4 for the communication standard of the radio communication unit 2 is shown.

The created transmission frame 60 is transmitted to the gateway 102. Since the measurement cycle of the sensor node 1 is known, all that the server 104 that has received the transmission frame 60 has to do is to set the value remaining after deducting the measurement cycle from the initial time stamp as the time stamp of the sensing data contained in the payload 61. Incidentally, the time stamp stored in the payload 61 is not an absolute time and a relative time within the sensor net system may be used, and in this case, the data length of the time stamp can be shortened.

Then, in the step S12 shown in FIG. 5, after the transmission is completed, the radio communication unit 2 is shifted to the standby state. In the step S13, the value of the counter for counting the sensing data is reset at 0 to prepare for the following measurement. And the ring buffer of the RAM 32 is cleared to prepare for the storage of new data.

In the step S14, it is judged whether a measurement period (the period during which 100 sensing data are acquired after the sensor 6 is turned on) has been completed or not, and if it has been completed, the process proceeds to the step S15, and if it has not been completed, the process proceeds to the step S18. This judgment can be made by using a parameter or graph for judging whether the sensing data have been measured 100 times or not. Or a parameter or a graph for judging whether the sensing data have been transmitted five times or not may be used. In other words, as FIG. 6 shows, in a single measurement period, 20 measurements of sensing data are repeated five times, and every time when 20 pieces of sensing data are accumulated, a plurality of sensing data are transmitted en bloc. Therefore, it is possible to judge whether a measurement period has been completed or not by counting the number of measurements or the number of transmissions of the sensing data.

If the measurement period has not been completed, the process proceeds to the step S18 and a measurement cycle of 50 msec of the sensor 6 is set in the timer of the RTC 4. Then, after the timer mode is set at 1 in the step S19, the microcomputer 3 is shifted to the standby state. Then, in the set 50 msec, the RTC 4 generates an interrupt signal to start the microcomputer 3.

On the other hand, if a measurement period has been completed, in the step S15 the sensor 6 is turned off and the predetermined time (for example, 5 seconds) is set in the RTC 4 as the down time of measurement. In the step S17, after setting the timer mode at 0, the microcomputer 3 is shifted to the standby state, and then the process enters a down period. Then, in the set five seconds the RTC 4 generates an interrupt signal to start the microcomputer 3 and the following measurement period begins.

Upon receiving the interrupt signal, the microcomputer 3 starts. In the step S20 shown in FIG. 5, if the current timer mode is "1" i.e. in the measurement period, the process proceeds to the step S4, and the sensor 6 acquires the sensing data, and if the timer mode is "0" representing the down period, the process proceeds to the step S2 and after switching on the sensor 6, the measurement period begins.

As a result of repeated execution of the operations described above, as FIG. 6 shows, the measurement period begins and the sensor 6 is switched on almost every 10 seconds. And at intervals of the predetermined measurement cycle (50 msec), the microcomputer 3 shifts from the standby state to the operational state, and acquires the sensing data from the sensor 6. And upon acquiring sensing data 20 times, it transmits 20 pieces of sensing data en bloc. When this transmission is repeated five times (100 measurements) the measurement period is terminated, and the sensor 6 is switched off. And the microcomputer 3 and the radio communication unit 2 shift to the standby state. At the end of the measurement period, the microcomputer 3 sets the predetermined down period (downtime=five seconds) in the RTC 4. When the down period has elapsed, the RTC 4 starts again the microcomputer 3 by the action of the interrupt signal and acquires 100 pieces of sensing data at intervals of 50 msec.

In FIG. 6, at the beginning of the measurement period (#1 in the figure), the microcomputer 3 stands by during the period of time from its start and the switching on of the sensor 6 until its stabilization (for example several msec). However, in the operation of second shift, the sensor 6 remains turned on. As a result, the measurement for the second shift is limited to the acquisition of the sensing data from the sensor 6 through the A/D converter 31 and the writing of the same in the RAM 32, and therefore the microcomputer needs to be operational only for a short period of time (for example, 1 msec). And from the first up to the $19^{th}$ measurement of the sensing data, only the microcomputer 3 and the sensor 6 need to be operational while the radio communication unit 2 consuming the largest amount of power remains in the standby state. Therefore, power consumption can be largely curtailed.

During the measurement period, however, the time required, after the acquisition of the $100^{th}$ sensing data, for the startup of the radio communication unit 2 and the completion of transmission must be added. Therefore, the whole length of time will be approximately 5 seconds.

The sensing data may be acquired by measuring them for five seconds by the predetermined cycle (50 msec) at intervals of approximately 10 second, and may be handled as almost a continuous flow of sensing data for observing the state of the living body.

As described above, in the sensor node 1 according to the present invention, the microcomputer 3 intermittently turns on and off the clock frequency (or lowers frequency) according to the timer of the RTC 4 regularly fed with power to acquire intermittently the sensing data. In this way, the microcomputer 3 consuming much power operates during the minimum necessary length of time, and the sensor 6 that requires time for its stabilization after the turning on and off of power stays operational. Since, as described above, the power consumption of the sensor 6 is very small as compared with the power consumption of the microcomputer 3, it is possible to prevent the wasteful consumption of power during the standby period of the microcomputer 3 when the sensor 6 is switched on and off.

Moreover, the operation time of the radio communication unit 2 consuming the greatest amount of power during its operational state can be shortened and the consumption of the battery 7 can be contained by transmitting en block a plurality of sensing data and by maintaining the radio communication unit 2 operational only during this transmission.

In addition, after the sensor 6 is used for measurement for the predetermined number of times or during the predetermined length of time, a down period is provided to leave the microcomputer 3 and the radio communication unit 2 in the standby state, and the sensor 6 is switched off. In this way, power consumption can be further curtailed. This down period may be provided by setting a period of time during which the sensing data may be handled as an almost continuous flow of data, and may be varied depending on the subject of measurement.

On the other hand, as in this example the continuous flow of sensing data acquired at intervals of 50 msec are transmitted en bloc in groups of 20 during a short period of time of 3 msec at intervals of 1 second, the ratio of a sensor node occupying the radio space is very small. As a result, for example in a sensor net system in which a plurality of sensor nodes 1 exist for each gateway 102, it will be easy to avoid the collision of radio spaces, and it will be possible to establish a highly reliable radio communication.

In addition, since sensing data are transmitted en bloc at intervals of a second, it is possible to secure a delay time that causes no stress to the user waiting for the computer 103 having received the same displays the sensing data. It is preferable that a good delay time causing no stress be within 3 seconds.

Second Embodiment

Figure 9:
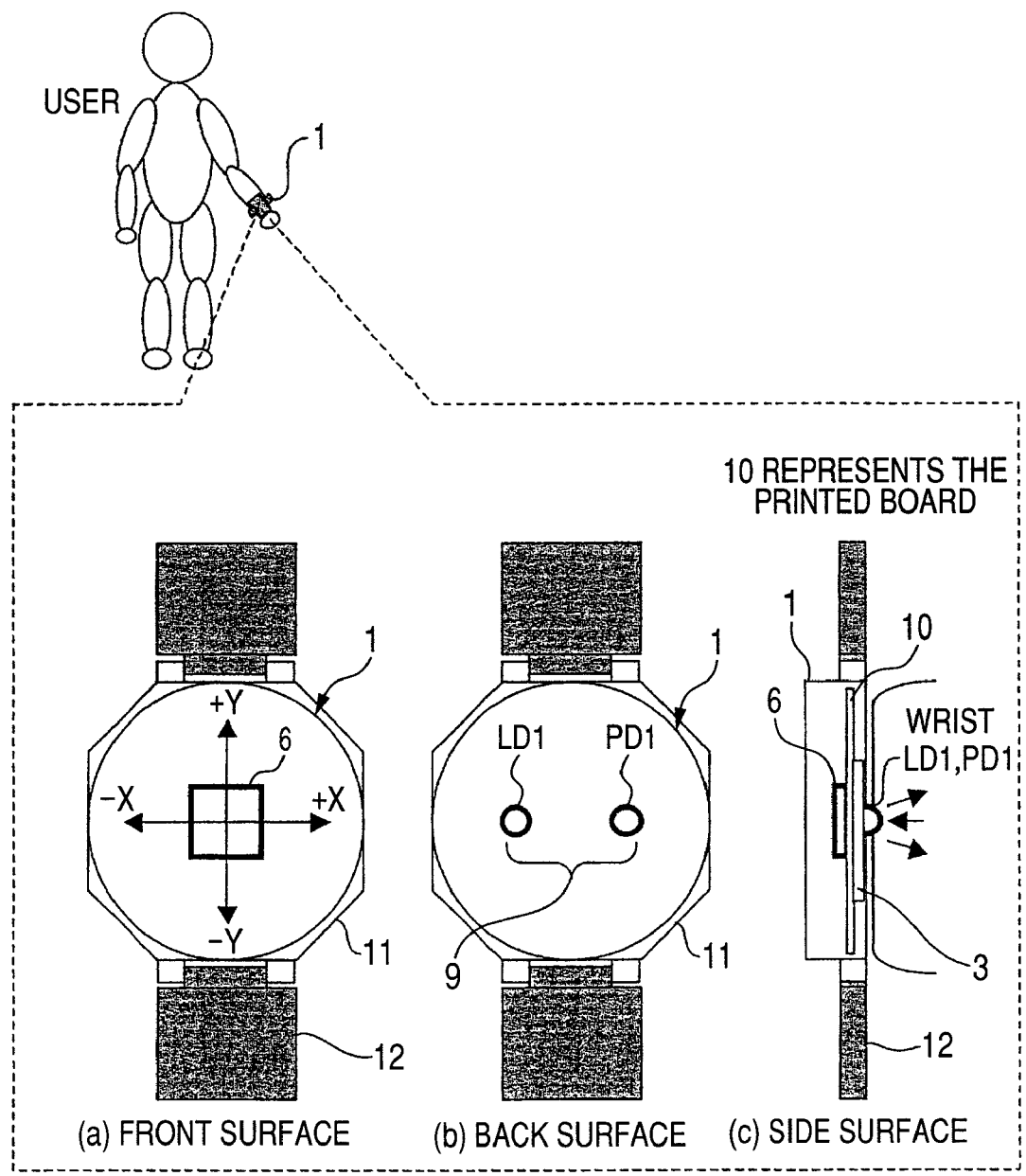
FIG. 9 shows the second embodiment and a bracelet-type sensor node, and (a) is a front elevation while (b) is a rear elevation and (c) is a side sectional view.

FIG. 9 shows the second embodiment, in which a pulse wave sensor 9 for measuring pulse waveform is added to the acceleration sensor 6 according to the first embodiment. It is identical to the first embodiment with respect to the other features.

On the backside of the case 11 of the sensor node 1, a pulse wave sensor 9 including a light-emitting element LD1 and a light-sensitive element PD1 is provided. This pulse wave sensor 9 uses an infrared light-emitting diode as the light-emitting element LD1, and adopts a phototransistor as the light-sensitive element PD1. Incidentally, a photodiode may be used in addition to the phototransistor as the light-sensitive element. On the backside of the case 11, the light-emitting element LD1 and the light-sensitive element PD1 are exposed, and can be facing with the arm skin.

This pulse sensor 9 irradiates subcutaneous blood vessels with infrared beams generated by the light-emitting element LD1, detects changes in the intensity of scattered light from the blood vessel due to changes in the blood stream by the light-sensitive element PD1, and estimates the pulse and the pulse wave from the cycle of changes in its intensity.

Figure 10:
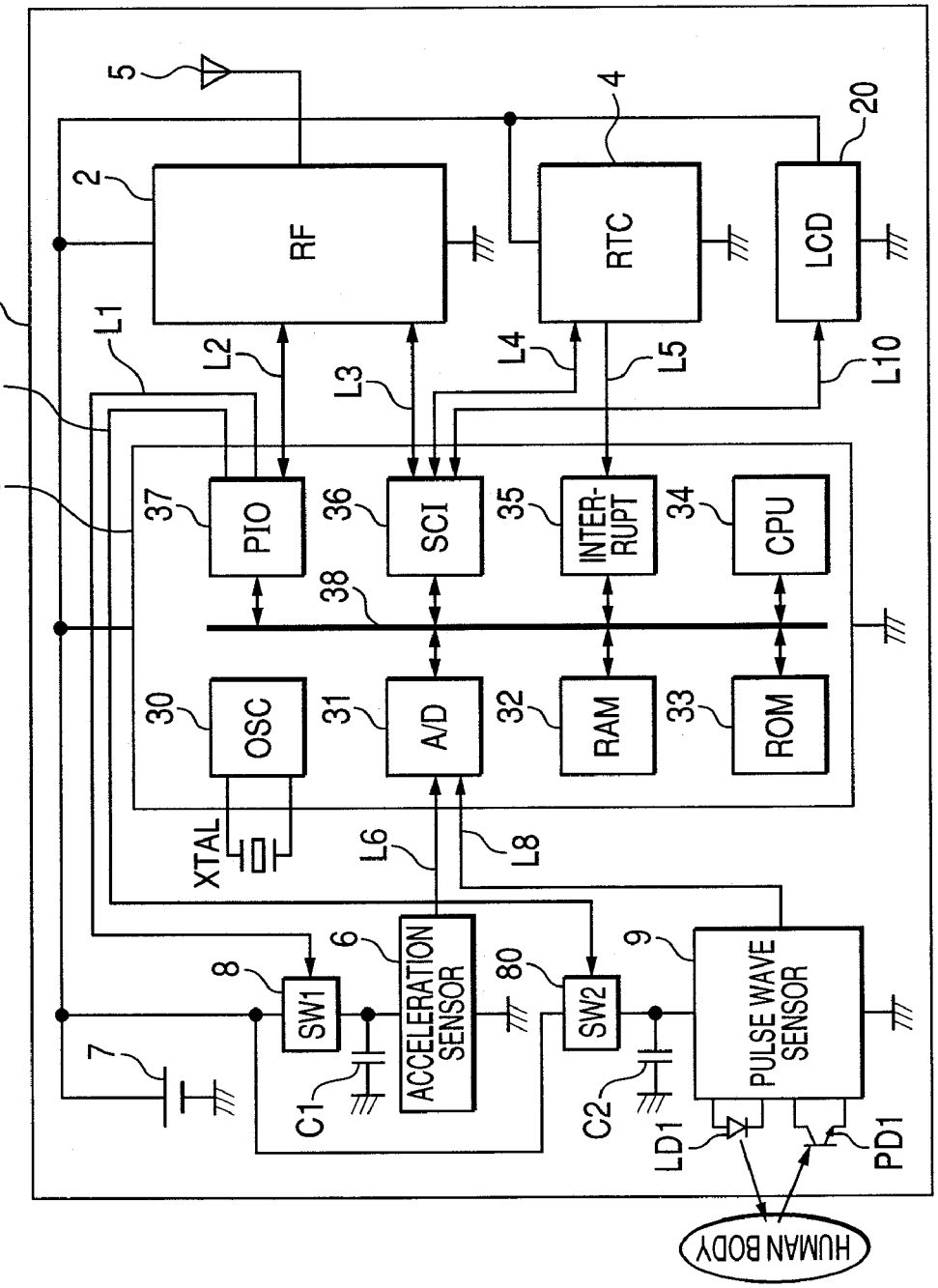
FIG. 10 is likewise a block diagram showing the configuration of the sensor node.

FIG. 10 is a block diagram showing the system configuration of the sensor node 1, wherein a pulse wave sensor 9 is added to the first embodiment described above in the lower left side of the figure.

The pulse wave sensor 9, like the acceleration sensor 6, is connected with an A/D converter 31 which converts the analog-value outputs into digital values. And the power source for driving the pulse sensor 9 is connected with the battery 7 through the switch 80. The switch 80, like the switch 8 of the first embodiment, is controlled by the PIO 37 and turns on and off the power supply to the pulse wave sensor 9. Incidentally, the switch 80 and the pulse wave sensor 9 are connected through a bypass capacitor C2. It will be possible to contain the wasteful consumption of power by controlling the switch 80 in such a way that the number of charges and discharges of the bypass capacitor C2 may be reduced.

The timing of controlling the pulse wave sensor 9 is similar to that of the acceleration sensor 6 shown in the first embodiment described above, and the power is switched on when the measurement period begins and it is turned off during the down period.

It is desirable that, during the measurement of pulse by the pulse wave sensor 9, the living body (user) keep quiet. If the user keeps moving, only wild waveforms of the pulse can be obtained, and no normal pulse can be detected. This is because the pulse wave sensor 9 is not kept in close contact with the arm, and is exposed to the ambient light in a time interval far shorter than the pulse cycle. Therefore, in order to detect a reliable pulse wave, the sensing must be carried out while the user keeps quiet. In this second embodiment, triaxial acceleration and pulse wave are measured with the same timing as that of the first embodiment, and a plurality of sensing data are transmitted en bloc to the gateway 102. For using these sensing data, the pulse wave for which the sensing data for acceleration are determined to be quiet should be adopted.

Figure 11:
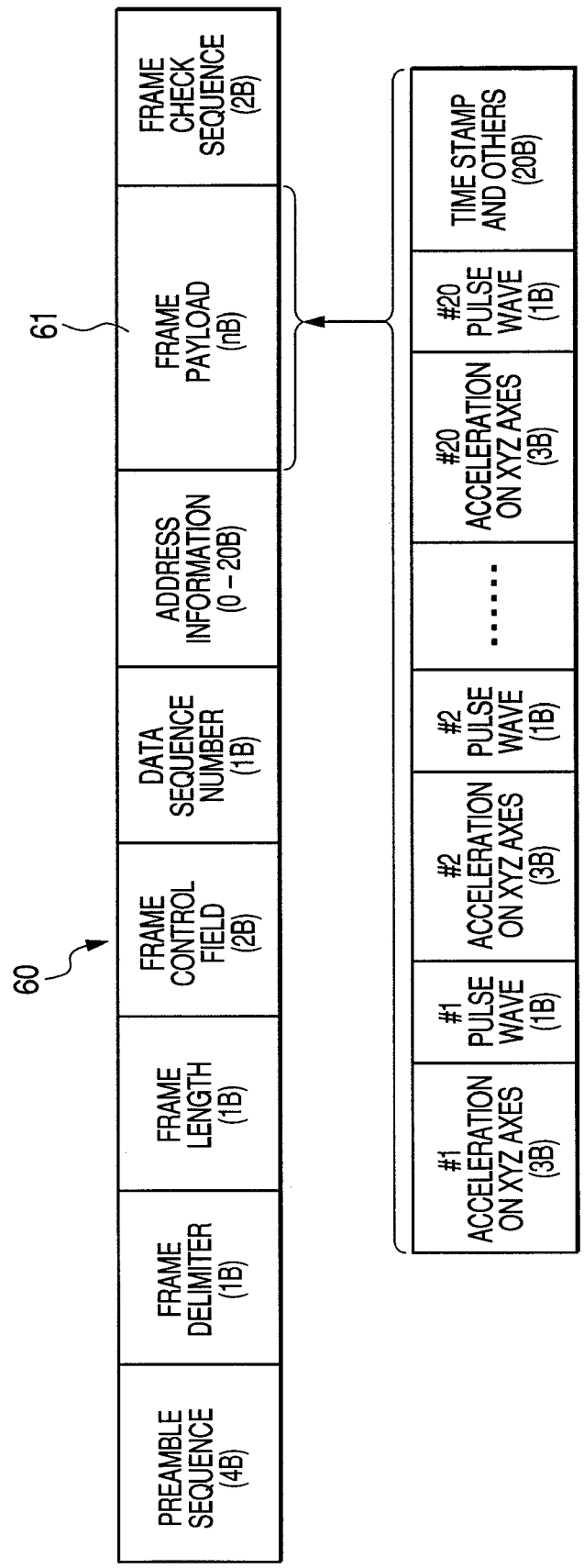
FIG. 11 is likewise an illustration describing a transmission frame.

The microcomputer 3 executes a control similar to that of the first embodiment, and after obtaining a plurality of sensing data (20 pieces) from the sensors 6 and 9, creates the transmission frame 60 shown in FIG. 11.

Figure 12:
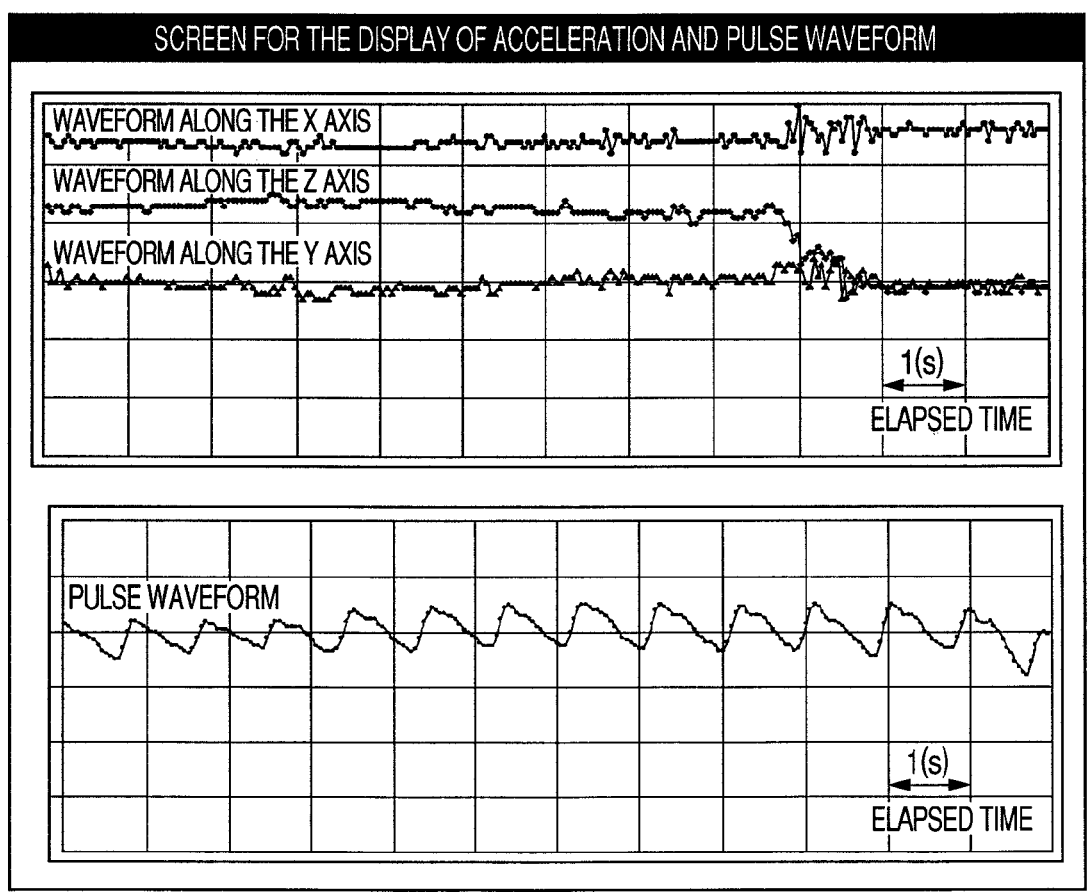
FIG. 12 is a screen image when the sensing data are displayed by the computer of a user.

The payload 61 of the transmission frame 60 stores 20 strings of acceleration and pulse wave sensing data in the chronological order. FIG. 12 shows an example of the sensing data relating to acceleration and pulse wave accumulated in the server 104 displayed by a computer 103 operated by the user of the sensor net system. In this example, the measurement period is a continuous period of 60 seconds for example.

In the figure, the horizontal axis represents the number of samples of sensing data, and the upper part of the figure shows triaxial acceleration while the lower part of the figure shows pulse waveform. The triaxial acceleration and pulse waveform are displayed almost continuously, and it is possible to monitor in almost real time the physical movement and pulse waveform of the wearer.

In addition, it is possible to add a liquid crystal display to the sensor node 1 to display the waveform, and the liquid crystal display can display in real time the acceleration waveform and pulse waveform computed by the sensors 6 and 9.

Third Embodiment

Figure 13:
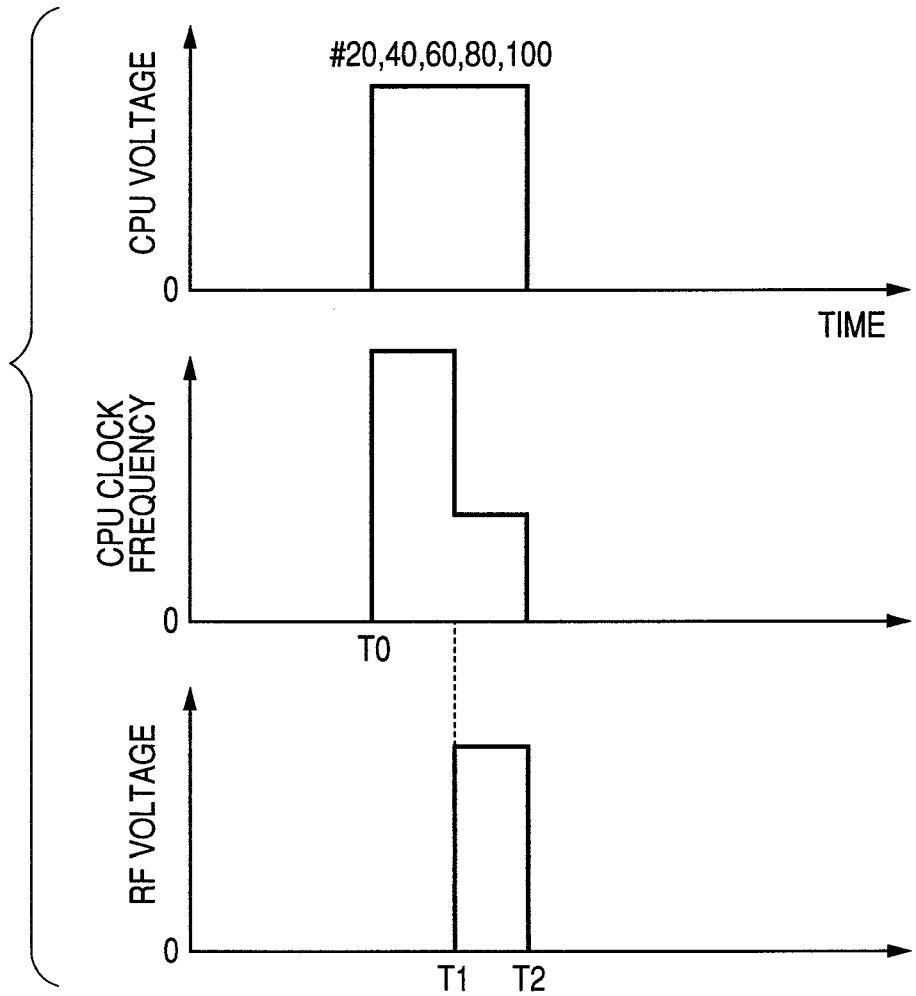
FIG. 13 shows the third embodiment and a time chart during a transmission showing the CPU voltage, the clock frequency and the voltage of the radio communication unit in relation to time.
Figure 14:
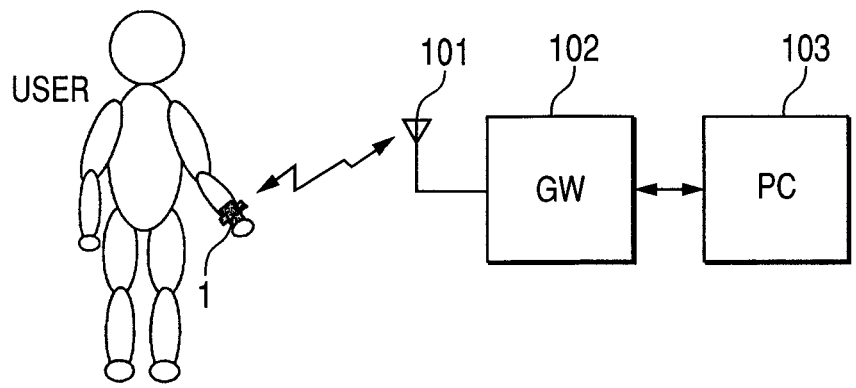
FIG. 14 is block diagram showing another example of sensor net system.

FIG. 13 shows partial modifications of the control shown in the first embodiment. In the step S11 shown in FIG. 5 of the first embodiment and #20 in FIG. 6, from the moment when the transmission frame is created until the end of the transmission by the radio communication unit 2, the clock of the microcomputer 3 is maintained at a constant value. In the third embodiment, on the other hand, after the start of the radio communication unit 2, the clock frequency of the CPU 34 is lowered, and other features are similar to the first embodiment.

In the step S11 described above, the CPU 34 of the microcomputer reads the sensing data (#1-#20) accumulated in the RAM 32 to create a transmission frame 670. And the created transmission frame 60 is transferred to the radio communication unit 2, which transmits the sensing data by radio communication.

When the created transmission frame 60 is transferred to the radio communication unit 2, the CPU 34 is charged with a low load of computation, and the system bus 38 reads the sensing data supplied by the RAM 32 with a sufficiently high speed with reference to the communication speed at which the radio communication unit 2 transmits. Therefore, after the start of the radio communication unit 2 and during the period of radio communication, any decline in the computational operation performance of the CPU 34 constitutes no problem and for this reason the operational clock for the CPU 34 supplied by the OSC 30 is lowered.

In FIG. 13, at the time T0 the microcomputer 3 starts from the standby state by the timer interrupt from the RTC 4, acquires the sensing data supplied by the sensor 6, and creates a transmission frame 60.

At the time T1 when the transmission frame 60 is completed, the CPU 34 starts the radio communication unit 2. At this time, the CPU 34 transmits the predetermined command to the OSC 30 to lower the clock. And when the radio communication unit 2 has completed a transmission, the microcomputer 3 shifts itself and the radio communication unit 2 to the standby state and waits for the following timer interrupt.

Generally speaking, since the power consumption of the CPU 34 is proportional to the product of clock frequency X voltage$^2$, power consumption can be reduced in proportion to the reductions in clock frequency, and it will be possible to extend further the life of the battery 7.

Incidentally, in each of the embodiments described above, we have chosen living bodies as the subject of measurement by the sensor 6. However, the choice is not limited to such living bodies, and machines and structures may be chosen as the subjects of measurement, and almost continuous sensing data can be likewise acquired.

In the case of a type that can be measured immediately after the start of the sensor 6, the sensor 6 can be switched on and off synchronously with the microcomputer 3.

In each of the embodiments described above, the sensing data transmitted by the sensor node 1 are transferred from the gateway 102 to the server 104. However, as shown in FIG. 15, the computer 103 may have the function of a server 104. In this case, the sensing data received by the gateway 102 are stored in the computer 103 used by the user. And the sensing data can be displayed as shown in FIG. 12 by the execution of the predetermined application in the computer 103.

As described above, the present invention can be applied to sensor nodes being driven by a battery for acquiring intermittently sensing data, and can be applied to a sensor net system including sensor nodes being driven by a battery for acquiring intermittently sensing data.

What is claimed is:

1. A sensor node comprising:

a control unit for obtaining information by driving sensor being comprised in said control unit;

a radio communication unit for transmitting information acquired by said control unit; and a battery for supplying said control unit, radio communication unit and sensor with electric power, wherein said control unit further comprises:

a clock supplying unit for supplying said control unit with clocks at a predetermined clock frequency;

a standby control unit for repeating at a predetermined cycle an operational state in which clocks of the predetermined frequency are supplied from said clock supply unit and a standby state during which the clock is suspended or the clock frequency is reduced during a predetermined measurement period;

a sensor control unit for starting the supply of electric power to said sensor when said predetermined measurement period starts, maintaining the power supply to the sensor even if the control unit is standing by during said predetermined measurement period, and cutting off the supply of power to the sensor when said predetermined measurement period end; and a measurement unit for acquiring information from said sensor every time when said control unit starts operating, wherein said clock supplying unit lowers the clock frequency due to be supplied to said control unit when said radio communication unit is shifted to the operational state.

2. The sensor node according to claim 1, wherein said measurement unit stores in the storage unit the information acquired from said sensor every time when said control unit starts operating, wherein said measurement unit further comprises a radio communication control unit for switching said radio communication unit from the standby state to the operational state, transmitting en bloc said information when the information stored in said storage unit has reached the predetermined number, and for switching said radio communication unit to the standby state when the transmission has been completed, and wherein said standby control unit switches said control unit to the standby state when said radio communication control unit has switched the radio communication unit to the standby state.

3. The sensor node according to claim 1, wherein said measurement unit stands by until said sensor stabilizes immediately after said sensor control unit has started the supply of power to said sensor.

4. The sensor node according to claim 1, wherein said predetermined measurement period is a period during which said measurement unit acquires the sensor information up to the number of times previously set, and said control unit repeats said predetermined measurement periods.

5. The sensor node according to claim 4, wherein said control unit is in the standby state between said predetermined measurement period and the following predetermined measurement period, and a measurement suspension period is created for shutting down the power supply to said sensor.

6. The sensor node according to claim 4, wherein said sensor node comprises a timer, being supplied regularly with electric power from said battery, for transmitting interrupt signals to said control unit at the predetermined cycle, and wherein said standby control unit sets the first cycle at said timer as the predetermined cycle during said predetermined measurement period and shifts the control unit to the operational state upon receiving an interrupt signal from said timer.

7. The sensor node according to claim 5, wherein said sensor node comprises a timer, being supplied regularly with electric power from said battery, for transmitting interrupt signals to said control unit at the predetermined cycle, and wherein said standby control unit sets the second cycle at said timer as the predetermined cycle when said predetermined measurement period has come to an end and shifts the control unit to the operational state upon receiving an interrupt signal from said timer.

* * * * *